Sept. 18, 1956 C. W. SKELTON ET AL 2,763,780
BINARY FREQUENCY DIVIDER
Filed April 18, 1955
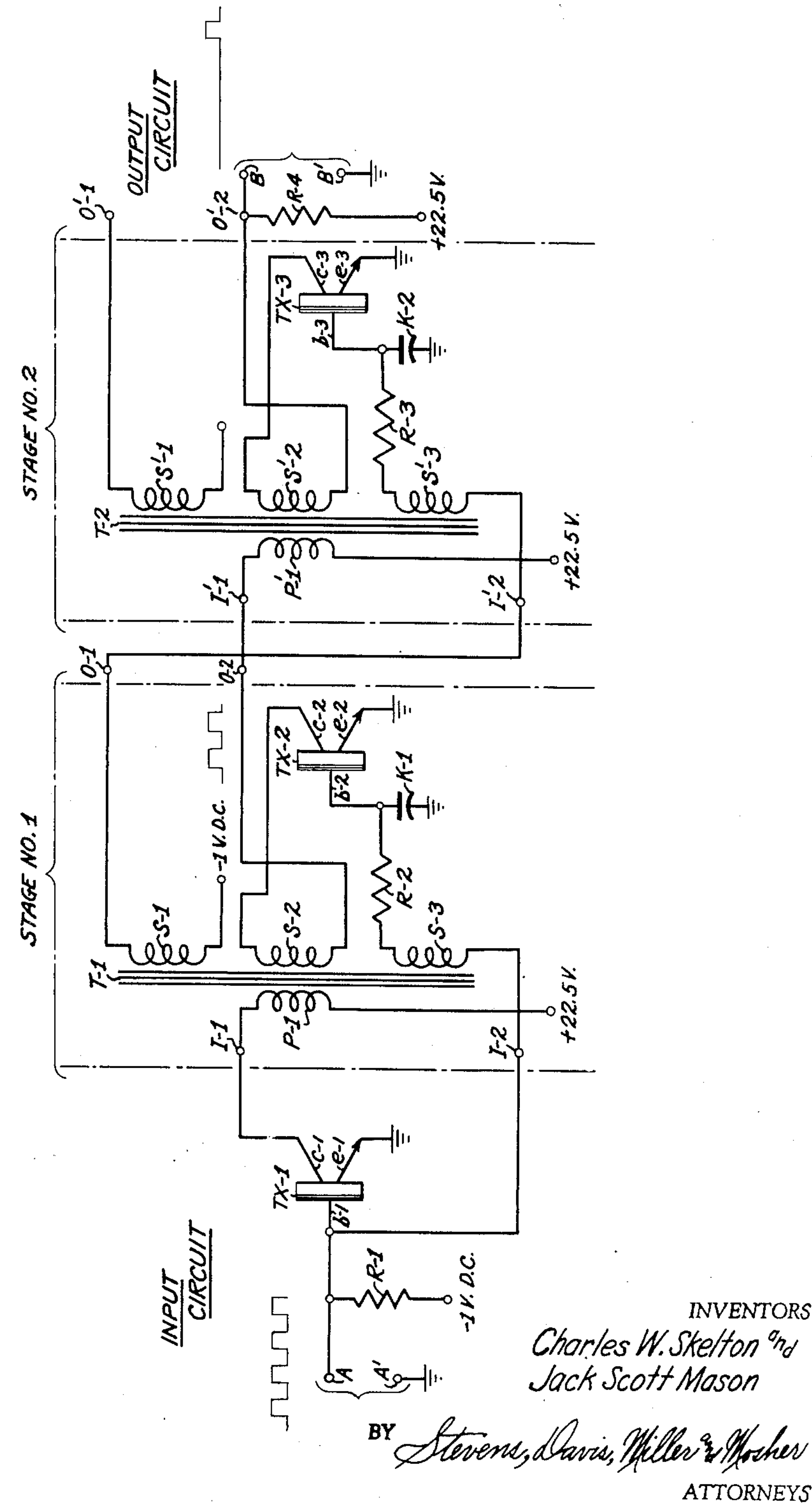
INVENTORS
Charles W. Skelton and
Jack Scott Mason
BY Stevens, Davis, Miller & Mosher
ATTORNEYS United States Patent Office 2,763,780

Patented Sept. 18, 1956

2,763,780

BINARY FREQUENCY DIVIDER

Charles W. Skelton, Irving, and Jack Scott Mason, Dallas, Tex., assignors to Texas Instruments Incorporated, Dallas, Tex., a corporation of Delaware Application April 18, 1955, Serial No. 501,920

15 Claims. (Cl. 250—36)

This invention relates generally to electronic circuits, and more particularly to an electronic circuit for use as a frequency divider.

In certain applications, there is a requirement for an economical and rugged circuit which is capable of producing an output frequency which is a sub-multiple of the applied input frequency. The present invention contemplates a frequency divider circuit of this type which is characterized by extremely reliable operation and minimum power consumption over extended periods of operation.

Accordingly, a primary object of the present invention is to provide a practical and economical frequency divider circuit for use in deriving the sub-multiple of any frequency applied thereto.

Another object of this invention is to provide an electronic binary frequency divider which employs barrier layer devices and magnetic components.

Another object of this invention is to teach a multiple stage frequency divider in which each basic stage includes a transistor, a resistor, a capacitor and a saturable transformer device with unique saturation characteristics.

Another object of this invention is to provide a novel basic circuit which is adapted to produce the half-multiple of a given input frequency.

Another object of this invention is to teach a novel basic circuit employing transistors and saturable core transformers which will be eminently well suited for cascade-connection to derive consecutive half-multiples of an input frequency.

A further object of this invention is to disclose a plurality of binary frequency divider stages adapted each to derive the half-multiple of an input frequency by the action of a transistor combined with a condenser, resistor and non-linear inductance.

A further object of this invention is to provide a circuit which will derive an output frequency equal to the input frequency multiplied by one-half raised to an integral exponent equal to number of basic stages.

A still further object of this invention is to provide a circuit in which the output frequency is equal to the input frequency divided by two to the $n^{th}$ power where "n" equals the number of novel basic stages.

Further objects and advantages of the present invention will become apparent from the following detailed description taken in conjunction with the accompanying drawings which form a part of this disclosure and in which:

Figure 1 illustrates schematically two of the basic frequency divider circuits connected in cascade.

Turning now to the detailed description of the form invention as shown in Figure 1, the drawing comprises a multiple stage electronic circuit. Each basic stage is provided with a transistor, a resistor, a capacitor and a saturable transformer device with suitable interconnections therebetween. More particularly, each novel basic stage such as the one indicated by the bracket marked Stage No. 1 in Figure 1 is provided with a pair of input terminals I–1 and I–2 respectively. Additionally, a pair of output terminals O–1 and O–2 is provided, and as will be developed more fully below, suitable input and output circuits are provided to supply and receive the respective input and output frequencies. For reasons which will become apparent as the detailed description of the invention proceeds, the input terminals I-1 and I–2 in the basic Stage No. 1 are connected to the end of windings P–1 and S–3 respectively. Conversely, the output terminals O–1 and O–2 are respectively connected to coils S–1 and S–2.

Within the brackets indicated as Stage No. 2 there is contained a second basic stage which is identical to Stage No. 1 and is interconnected thereto. The second basic stage, or circuit, is provided with input terminals I′–1 and I′–2 connected to coils P′–1 and S′–3 respectively in the same manner as shown in Stage No. 1. Also, output terminals O′–1 and O′–2 are provided and these are connected to secondary coils S′–1 and S′–2 respectively.

In Figure 1, two of the basic stages have been interconnected to illustrate a cascade connection, and an output circuit comprising load resistor R–4 has been coupled to the second stage for developing the output frequency. The versatility of the basic circuit is such that the second stage may be eliminated and the output circuit connected directly to output contact O–2 of the first basic stage to perform a single binary division.

Conversely, any desired number of binary divisions can be secured by merely disconnecting the present output circuit from the second basic stage, coupling additional stages thereto, and reconnecting the output circuit to the last of the basic stages. Since the method of connecting further stages is deemed evident, it is sufficient to state here that S′–1 must be connetced to the negative biasing voltage, contact O′–1 must be connected to feed the base of the next transistor via the proper secondary coil of the succeeding transformer, and O′–2 must be connected to B-plus via the primary coil of the succeeding transformer.

The output frequency obtained by cascading a number of the basic stages of this invention will equal the input frequency divided by two raised to a power equal to the number of stages. Hence, the cascade connection of "$n$" stages provides an output frequency equal to the input frequency divided by $2^n$, or stated mathematically, $f_{out}=f_{in}/(2)^n$ where the exponent "$n$" in the denominator is identically equal to the number of basic stages.

Continuing now with the detailed description, in Figure 1 the terminals A—A′ of the input circuit are provided to accept an input signal at some given frequency. This input signal is shown diagrammatically just above the input terminals A—A′ in Figure 1 and may comprise the square wave input signal as shown. The input circuit may comprise transistor TX–1 and biasing resistor R–1.

The input square wave is coupled to the base of transistor TX–1, along with a negative bias of one volt which is applied through resistor R–1 as shown in the diagram. It will be appreciated that other magnitudes of bias voltage may be found equally suitable in practicing the invention. The emitter electrode $e$–1 of the transistor TX–1 is grounded and the collector electrode $c$–1 is connected via contact I–1 to one end of the primary winding of transformer T–1. The other end of this primary winding, P–1, is connected via contact I–2 to a B-plus voltage supply. In practicing this invention a conventional voltage supply of 22.5 volts was utilized. However, the invention is of course not limited to a specific magnitude or type of voltage supply, except that it has been found advisable that the power supplies used with the invention should have a low internal impedance to microsecond pulses of electric current.

The transformer T–1 includes a primary P–1, as earlier mentioned, and a plurality of secondary windings S–1, S–2, and S–3 respectively. The primary and secondary windings are arranged in inductive relationship on a permeable core of unique characteristics. More particularly, the core of transformer T–1 is characterized by retentivity properties such that the residual induction is substantially equal to the induction at saturation. The transformer T–1 constitutes a species of multi-coil saturable reactor which is very suitable for application in this binary frequency divider circuit.

In practicing this invention, a type 220 binary scaler as produced by the Wang Laboratories has proved satisfactory as a saturable reactor. This device is characterized by a 15 volt output pulse and a 20 milliampere output pulse at 2 microseconds for substantially the same input magnitudes and time intervals. It will be appreciated, of course, that the invention is by no means limited to the use with the type 220 scaler, but will operate equally well with any suitable saturable core transformer of the proper characteristics.

Continuing now with the detailed description of the circuit shown in Figure 1, the base *b*–1 of the transistor TX–1 is coupled via contact I–2 to one end of the secondary coil S–3 of transformer T–1.

The opposite end of S–3 is connected through coupling resistor R–2 to the base of transistor TX–2. The base *b*–2 is coupled to ground, via capacitor K–1.

The collector electrode *c*–2 of transistor TX–2 is coupled to one end of secondary winding S–2, and the emitter electrode is connected to ground. The opposite end of S–2 is coupled to the B-plus voltage supply by way of contact O–2 and I′–1 through the primary coil P′–1 of transformer T–2. As earlier stated, the B-plus supply may be of any suitable type, and should preferably possess low impedance to current pulses of microsecond duration. A B-plus supply of 22.5 volts is applied to TX–2, and this is the same magnitude of supply voltage as was applied to transistor TX–1.

The secondary winding S–1 of transformer T–1 is connected by way of contacts O–1 and I′–2 to the secondary winding S′–3 of transformer T–2. A negative bias of one volt magnitude is applied through windings S–1, S′–3 and resistor R–3 to the base of transistor TX–3. The base *b*–3 of transistor TX–3 is connected to ground via capacitor K–2, and the emitter electrode *e*–3 is grounded directly as in the previous stages.

The transformer T–2 like the earlier described transformer T–1, includes a primary P′–1, and plural secondaries S′–1, S′–2 and S′–3, respectively.

The primary P′–1 is connected between B-plus and the transistor TX–2, through coil S–2 of transformer T–1, and the secondary winding S′–3 is interconnected between TX–3 and the negative bias source via S–1 and contacts I′–2 and O–1 as explained earlier in this specification.

The secondary coil S′–2 is coupled at one end of the 22.5 volt B-plus supply by way of contact O′–2 and resistor R–4. The other end of coil S′–2 is coupled to the collector electrode *c*–3 of transistor TX–3. The contact O′–1 of the secondary coil S′–1 is shown with no connections, and the terminals B—B′ of the output circuit are connected between one end of resistor R–4 and ground.

While the circuit shown in Figure 1 will derive two consecutive half-multiples, and "count-down" to one-fourth the input frequency, it will be appreciated that by properly connecting S′–1 to bias another transistor (say TX–4) in the manner illustrated for winding S–1 of transformer T–1, the basic stages may be readily cascade-connected to "count down" still further. Of course in this case transistor TX–3 must then be connected to B-plus through the primary winding of the interstage transformer, in the same manner as transformer TX–2 is presently connected. It will now be obvious that by repeated applications of the basic stages any desired binary sub-multiple of the input frequency can be obtained.

Proceeding now to the theory of the novel frequency divider of this invention, in operation, all of the semiconductors, or transistors TX–1, TX–2 and TX–3 are biased to cutoff. If a square wave input signal is fed simultaneously to the base *b*–1 of transistor TX–1 and to one terminal of secondary coil S–3 of the transformer T–1, the first positive pulse on the base of transistor TX–1 will allow it to conduct. This creates a current flow in the primary coil P–1 of transformer T–1. The core of T–1 is driven to saturation by the magnetomotive force of the current of the primary coil and because of the high retentivity of the core, it remains at saturation until an opposite magnetomotive force is applied. Generally, as earlier stated, the core must possess retentivity properties such that the residual induction is substantially equal to the induction at saturation. A transformer device having a ferrite core has these characteristic properties and is suitable for use in practicing this invention.

When current flow occurs through the primary winding P–1, a negative voltage pulse is induced into the three secondary coils of transformer T–1 thereby. However, the turns ratio of winding S–3 to the primary coil P–1 is such that the induced negative pulse exactly cancels the positive pulse applied from the input signal and, therefore, no signal is applied to the base of the transistor TX–2. It follows then that there is no current flow in secondary coil S–2 in response to the induced voltage because of the fact that transistor TX–2 is non-conductive at this time. The negative voltage pulse from S–1 is fed through coil S′–3 of transformer T–2 to the base of transistor TX–3, but it has no effect since the transistor TX–3 is already non-conductive.

At the next positive pulse delivered to the input terminals, however, transistor TX–1 again becomes conductive so that current flows through the primary coil of transformer T–1 from the B-plus supply of 22.5 volts magnitude.

However, because the core of transformer T–1 is already at saturation in this direction, no voltages can be induced in the three secondary coils. Since no negative voltage pulse is induced during this portion of the signal in the secondary coil S–3, the positive pulse from the input signal reaches the base of transistor TX–2 and allows it to conduct. The time constant of R–2 and K–1, the resistor-capacitor network in the base circuit of transistor TX–2 is proportioned such that the transistor TX–2 remains conductive after the positive pulse to the base of TX–1 and coil S–3 of T–1 has passed. When the positive pulse has passed, TX–1 again becomes non-conductive with the result that current flow in the primary coil of transformer T–1 ceases and the flux produced by it no longer opposes the flux created by the current flowing through transistor TX–2, secondary coil S–2 and the primary coil of transformer T–2 during the conductive period of transistor TX–2. The flux due to this current flow in coil S–2 of transformer T–1 then drives the core of transformer T–1 to saturation in the opposite direction and at the same time induces a positive voltage pulse in the secondary coil S–1.

It will be readily obvious then, that for each pair of positive input pulses applied to transistor TX–1, only a single positive pulse will be fed to the primary coil P′–1 and the secondary coil S′–3 of the transformer T–2. The operation of the second stage of the device, which contains transformer T–2 and transistor TX–3, is identical to that of the first stage. Hence, for each two pulses it receives it produces one pulse across the output resistor R–4. Thus, four positive pulses to the input transistor TX–1 produce a single output pulse across the output terminals B—B′, effectively causing a frequency division of two per stage, and reducing the input frequency by a factor of 4 has been thus illustrated, it will be readily obvious that division by a factor of 2 may be secured by utilizing the output signal pulse from the stage containing transistor TX–2. Or, the stages may be connected in cascade to secure as many half-multiples as are desired, and continue the successive divisions therefor.

In conclusion, it will be seen that the core of the interstage coupling transformers are periodically driven to saturation and remain thereat until an opposite magnetomotive force is applied. While the induced voltage is such that a positive pulse applied to the secondary winding from the input signal may be effectively canceled out and no signal applied to the base of succeeding transistors, the next positive pulse renders the first transistor conductive and draws current through the primary winding of the transformer. Then, as explained earlier in this specification, the positive pulse from the input signal reaches the base of the second transistor and renders it conductive.

Therefore, while I have illustrated and described practical and efficient forms of my novel electronic circuit, suitable for the proposed uses, it will be understood that various modifications, alterations and substitutions may be made therein without departing from the true spirit and scope of the invention as defined in the appended claims.

What is claimed is:

1. In a frequency divider circuit provided with a source of positive voltage and a source of negative voltage; a first, a second, and a third transistor provided each with a base electrode, a collector electrode and a grounded emitter electrode; a pair of transformers provided each with a primary winding, a first, second and third secondary winding, and a core having a residual induction substantially equal to the inductance at saturation; means conductively interconnecting the primary winding of the first of said transformers directly to said collector electrode of first transistor, means conductively interconnecting the primary winding of said second transformer through the second secondary winding of said first transformer directly to said collector electrode of said second transistor; a first coupling resistor, a second coupling resistor and an output resistor; means coupling said output resistor to said collector electrode of said second transistor through said second secondary winding of said second transformer, conductive means serially interconnecting said base of said first transistor through said third secondary winding of said first transformer and said first coupling resistor to said base of said second transistor; conductive means coupling said first secondary winding of said first transformer through said third winding of said second transformer and said second coupling resistor to said base of said third transistor; first and second capacitor means connected each between ground and the base of said second and third transistor, respectively; a biasing resistor connected to the base of said first transistor, means connecting said positive voltage source to source to said primary winding of said first and second transformers and, means connecting said negative voltage source to said biasing resistor and said first secondary winding of said first transformer.

2. In a frequency divider circuit provided with a positive and a negative voltage source; a first transformer provided with a primary coil, first, second and third secondary coils and a core having residual induction equal to the induction at saturation, said first secondary winding of said first transformer connected at one end to said negative voltage source; a biasing resistor, a first transistor provided with a grounded emitter, a collector and a base electrode; said collector connected to said positive voltage source serially through said primary of said first transformer, said base connected to said negative voltage source through said biasing resistor and to said third secondary winding of said first transformer, a pair of capacitors each having one terminal thereof connected to ground; a second transformer provided with a primary coil, first, second and third secondary coils and a core having residual induction equal to the induction at saturation, said third secondary winding thereof connected to the other end of said first secondary winding of said first transformer; a second transistor provided with a grounded emitter, a collector, and a base electrode connected to one of said grounded capacitors; said collector serially connected to said positive voltage source through said second secondary winding of said first transformer and said primary winding of said second transformer; a first coupling resistor connecting said base of said second transistor to said third winding of said first transformer, an output resistor, a third transistor provided with a grounded emitter, a collector and a base electrode connected to the other of said grounded capacitors, said collector serially coupled to said positive voltage supply through said second secondary winding of said second transformer and said output resistor, and a second coupling resistor connecting the base of said third transistor to said third winding of said second transformer.

3. In a frequency divider circuit adapted to receive electrical energy from positive and negative voltage sources; a first transistor having a base, a collector and a grounded emitter; a biasing resistor connected between said base and said negative voltage source; a transformer with a core characterized by a residual induction substantially equal to that at saturation, a primary winding and a first, second and third secondary winding located thereon, said primary winding of said first transformer serially interconnected between said positive voltage source and said collector electrode of said first transistor, and said first secondary winding thereof connected to said negative voltage source; a first capacitor with a grounded terminal, a coupling resistor serially interconnected between said third secondary winding of said first transformer and the ungrounded terminal of said capacitor; a second transistor having a collector, a grounded emitter electrode and a base, said base thereof connected to said ungrounded terminal of said first capacitor and said collector thereof connected to said second secondary winding of said first transformer; a second transformer with a core characterized by a residual induction substantially equal to that at saturation, a primary winding and a first, second and third secondary winding, said primary winding of said second transformer serially interconnected to said second secondary winding of said first transformer; a second capacitor with a grounded terminal, a coupling resistor serially interconnected between said third secondary winding of said second transformer and the ungrounded terminal of said second capacitor; an output resistor, a third transistor having a grounded emitter, a collector and a base connected to said ungrounded terminal of said second capacitor, said collector electrode of said third transistor serially connected to said voltage supply through said output resistor and said second secondary winding of said second transformer, means connecting said first transistor base to said third secondary winding of said first transformer, and means connecting said third secondary winding of said second transformer to said first secondary winding of said first transformer.

4. In a frequency divider circuit provided with access to a source of positive and negative voltage; a first transistor provided with a grounded emitter, a base and a collector; a biasing resistor connected between said base and said negative voltage source; a transformer provided with a primary winding, a plurality of secondary windings and a core characterized by a residual induction substantially equal to that existing at saturation, said primary winding serially connected between said positive voltage source and said collector electrode of said first transistor; a capacitor with a grounded terminal, a second transistor provided with a grounded emitter, a collector and a base connected to the ungrounded terminal of said capacitor; a coupling resistor connected between said ungrounded terminal of said capacitor and one end of one of said secondary windings of said transformer, means connecting the opposite end of the said secondary winding to said base of said first transistor, and means for developing an output signal and connecting said positive voltage supply to said collector electrode of said second transistor through another of said secondary windings of said transformer.

5. In a frequency divider circuit provided with access to a source of positive and negative voltage; a first semi-conductor provided with a plurality of electrodes, one of which is connected to ground; means for supplying said negative voltage to one of said electrodes to bias said first semi-conductor beyond cut-off; saturable transformer means characterized by a residual induction substantially equal to the induction at saturation, said transformer provided with a primary winding and a plurality of secondary windings, said primary winding conductively interposed between said source of positive voltage and one of said electrodes of said first semi-conductor; a coupling resistor, a second semi-conductor provided with a plurality of electrodes, one of which is grounded, a second of which is connected to said positive supply voltage through one of said secondary windings, and another of which is serially connected through said coupling resistor and another of said secondary windings to said first semi-conductor electrode which is supplied said negative voltage, and, capacitor means connected at one terminal to the juncture of said coupling resistor and said other secondary winding and at the other terminal to ground.

6. In a frequency divider circuit provided with access to a positive voltage source and a negative voltage source; first semi-conductor means having first, second and third electrodes, said latter electrode connected to ground; non-linear inductive means having a residual induction substantially equal to the induction at saturation, a primary coil and a plurality of secondary coils, said primary coil conductively interconnected between said positive voltage supply and said first electrode on said first semi-conductor; a capacitor, means to develop an output pulse, a second semi-conductor having first, second and third electrodes with said last named electrode connected to ground, said first electrode coupled to said positive voltage supply through one of said secondary windings in series with said means for developing an output pulse, said second electrode of said second semi-conductor coupled through said capacitor to ground; a coupling resistor connected between said second electrode of said second semi-conductor and one end of a different secondary coil, means connecting said second electrode of said first transistor to the other end of said different coil, and biasing means for temporarily maintaining said semi-conductors in a non-conductive state between applications of an input pulse.

7. In a circuit adapted to derive successive half multiples of an input frequency, a basic stage which includes an induction device having a primary winding and a first, a second and a third secondary winding mounted on a core characterized by residual induction substantially equal to the induction at saturation; a semi-conductor provided with a grounded emitter, a base and a collector; a capacitor connected between ground and said base, a resistor interconnected between said base and a first end of said third secondary winding, a pair of input terminals connected respectively to one end of said primary winding and to the other end of said third secondary winding, a pair of output terminals connected respectively to one end of said first secondary winding and to said collector through said second secondary winding.

8. In a circuit adapted to derive successive binary quotients, a basic stage comprising a saturable inductor having input and output windings mounted in inductive relation and characterized by a core having residual induction substantially equal to the induction thereof at saturation, a barrier layer device provided with a plurality of electrode elements connected thereto, means maintaining one of said electrode elements at ground potential, capacitor means connecting another of said electrode elements to ground, a first input terminal connected to an end of an input winding, a second input terminal connected through one of the output windings to said another electrode element, a first output terminal connected to an end of another of the output windings, and a second output terminal connected through still another of said output windings to still another of said electrode elements.

9. In a frequency divider circuit having access to sources of positive and negative voltage, a saturable inductor having input and output windings and characterized by a core having residual induction equal to the induction substantially thereof at saturation, a barrier layer device provided with a plurality of electrode elements, means maintaining one of said elements at ground potential, capacitor means connecting another of said elements to ground, a first input terminal connected to an end of an input winding, a second input terminal connected through one of the output windings to said another electrode element, a first output terminal connected to an end of another of the output windings, a second output terminal connected through still another of said output windings to still another of said electrode elements; an input circuit comprising a transistor having a grounded emitter, a base and a collector; an output circuit including an impedance means connected to said second output terminal, means connecting said collector of said transistor to said first input terminal and said base to said second input terminal, means connecting said negative voltage source to said base of said transistor and, means connecting said positive voltage source through said input winding to said collector of said transistor and through said impedance means to said second output terminal.

10. In a frequency divider circuit, a pair of basic stages of the type claimed in claim 8, an input circuit including a transistor with a grounded emitter and at least two other electrode elements, an output circuit comprising a load impedance, means connecting said second and first output terminals of one of the basic stages to said first and second input terminals of the other of said basic stages, respectively, means connecting a first and a second electrode of said transistor to said first and second input terminals of said first basic stage respectively, and means connecting said load impedance to said second output terminal of said second basic stage.

11. In a frequency divider circuit adapted to multiply an input frequency by one-half raised to an integral power equal to the number of basic stages, a plurality of basic stages of the type claimed in claim 8, an input circuit coupled to the input terminals of the first of the said basic stages, an output circuit coupled to the second output terminal of the last of said basic stages, means connecting the first output terminal of each basic stage other than the last to the second input terminal of the succeeding basic stage, and, means connecting the second output terminal of each basic stage other than the last to the first input terminal of the succeeding stage.

12. A basic frequency divider stage for use in deriving binary quotients which comprises a plural winding inductor having primary and secondary windings linked by magnetic flux and mounted on a core characterized by a remanent flux substantially equal to the saturation flux, a first input terminal connected to one end of a primary winding of said inductor, a first output terminal connected to one end of one secondary winding, a second input terminal, a second output terminal, a coupling resistor, a plural electrode semi-conductive circuit element having a first electrode grounded, a second electrode connected through another of said secondary windings to said second output terminal and a third electrode serially interconnected through said coupling resistor and through still another secondary winding to said second input terminal, and, capacitor means interconnected between ground and said third electrode.

13. In a cascade circuit for computing consecutive half multiples of an input frequency, a plurality of basic stages as defined in claim 12, means interconnecting the first and second output terminal of each basic stage to the second and first input terminal of the successive basic stage respectively, input circuit means connected to feed the first of said basic stages and, output circuit means adapted to develop the output frequency derived by said cascade circuit.

14. In a cascade circuit for computing consecutive half multiples of an input frequency which includes a plurality of basic stages as defined in claim 12, means interconnecting the first and second output terminal of each basic stage to the second and first input terminal of the successive basic stage, input circuit means connected to feed the first of said basic stages, output circuit means adapted to develop the output frequency derived by said cascade circuit, means for applying a positive voltage to said second electrode of said plural electrode semiconductive circuit element in each basic stage, and, means for normally biasing each of said semiconductive circuit elements beyond cutoff.

15. In a frequency divider circuit, having access to sources of B-plus and bias voltages, a plurality of basic stages of the type claimed in claim 8, an input circuit including a transistor with a grounded emitter and at least two other electrode elements, an output circuit including a load impedance, means connecting said second and said first output terminals of each basic stage to said first and second input terminals respectively of each succeeding basic stage, means connecting a first and a second electrode of said transistor in said input circuit to said first and second input terminals of the first basic stage respectively, means connecting said load impedance to the second output of the last basic stage, means for connecting said B-plus voltage to the input windings of each saturable inductor, and means for connecting said bias voltage to said second input terminal of each basic stage except the first one through said another output winding, and, means for connecting said bias voltage to said second electrode of said input circuit transistor.

No references cited.